(12) United States Patent
Heckerman et al.

(10) Patent No.: US 8,605,089 B1
(45) Date of Patent: Dec. 10, 2013

(54) DATA VISUALIZATION USING ASSOCIATION NETWORKS

(75) Inventors: David E. Heckerman, Bellevue, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1946 days.

(21) Appl. No.: 09/781,727

(22) Filed: Feb. 12, 2001

(51) Int. Cl.
*G06T 11/20* (2006.01)
*G06T 11/40* (2006.01)
*G09G 5/20* (2006.01)

(52) U.S. Cl.
CPC .............. *G06T 11/206* (2013.01); *G06T 11/203* (2013.01); *G06T 11/40* (2013.01); *G09G 5/20* (2013.01)
USPC ..................... 345/440; 345/440.1; 345/440.2; 345/441; 345/442; 345/443

(58) Field of Classification Search
CPC ..... G06T 11/206; G06T 11/203; G06T 11/40; G09G 5/20
USPC .......... 345/440–443, 736, 158, 853, 184, 2.2; 382/240, 226; 717/157, 144, 159
See application file for complete search history.

(56) References Cited

U.S. PATENT DOCUMENTS

| | | | |
|---|---|---|---|
| 5,136,690 A * | 8/1992 | Becker et al. .................. | 715/853 |
| 5,596,703 A * | 1/1997 | Eick et al. ...................... | 715/700 |
| 5,751,931 A * | 5/1998 | Cox et al. ....................... | 345/440 |
| 5,797,012 A * | 8/1998 | Blainey et al. ................. | 717/157 |
| 5,808,615 A * | 9/1998 | Hill et al. ....................... | 715/853 |
| 5,835,085 A * | 11/1998 | Eick et al. ...................... | 715/853 |
| 6,216,134 B1 * | 4/2001 | Heckerman et al. ......... | 707/104.1 |
| 6,285,999 B1 * | 9/2001 | Page ................................. | 707/5 |
| 6,297,805 B1 * | 10/2001 | Adler et al. ..................... | 345/158 |
| 6,356,285 B1 * | 3/2002 | Burkwald et al. ............. | 715/853 |
| 6,437,804 B1 * | 8/2002 | Ibe et al. ......................... | 345/736 |
| 6,466,696 B1 * | 10/2002 | Politis ............................ | 382/226 |
| 6,781,599 B2 * | 8/2004 | Abello et al. .................. | 345/629 |
| 6,897,866 B1 * | 5/2005 | Hetzler et al. ................. | 345/440 |
| 7,013,395 B1 * | 3/2006 | Swiler et al. .................... | 726/25 |

OTHER PUBLICATIONS

Frank Wietek "Modelling Multidimensional Data in a Dataflow-Based Visual Data Analysis Environment" 1999, p. 1-15.
Chickering, D. M., et al., "Efficient Approximations for the Marginal Likelihood of Bayesian Networks with Hidden Variables", *Technical Report MSR-TR-96-08*, Mar. 1996, p. 1-37.
Heckerman, D., et al., "Models and Selection Criteria for Regression and Classification", *Technical Report MSR-TR-97-08*, May 1997, p. 1-11.
Thiesson, B., et al., "Learning Mixtures of DAG Models", *Technical Report MSR-TR-97-30*, Dec. 1997, p. 1-28.
Cadez, I., et al., "Visualization of Navigation Patterns on a Web Site Using Model Based Clustering", *Technical Report MSR-TS-00-18*, Mar. 2000, p. 1-20.

* cited by examiner

*Primary Examiner* — Jin-Cheng Wang
(74) *Attorney, Agent, or Firm* — Lee & Hayes, PLLC (57) ABSTRACT

A system and method are employed to construct an association network to visualize relationships between variables of a data set. The relationships characterized by the association network may include symmetric or asymmetric measures of association between variables learned from the data. The association network includes nodes, which represent variables, and edges, which represent associations between variables. As a result, the association network helps a user to visualize useful information from data according to the determined measure of association.

32 Claims, 7 Drawing Sheets

FIG. 10

DATA VISUALIZATION USING ASSOCIATION NETWORKS

TECHNICAL FIELD

The present invention relates generally to high-dimensional data, and more particularly to the visualization of such data using association networks.

BACKGROUND

With the advent of the Internet, and especially electronic commerce ("e-commerce") over the Internet, the use of data analysis tools, has increased. In e-commerce and other Internet and non-Internet applications, databases are generated and maintained that have large amounts of information. Such information can be analyzed, or "mined," to learn additional information regarding customers, users, products, etc.

Data mining (also known as Knowledge Discovery in Databases—KDD) has been defined as "The nontrivial extraction of implicit, previously unknown, and potentially useful information from data." It uses machine learning, statistical and visualization techniques to discover and present knowledge in a form that is easily comprehensible to humans. A—known type of data visualization technique is a dependency network. Briefly stated, a dependency network is a graphical representation of probabilistic relationships, such as may be a collection of regressions or classifications of among variables in a domain. Dependency networks are particularly useful in visualizing data because several computationally efficient algorithms exist for learning both the structure and probabilities of a dependency network from data. In addition, dependency networks are well suited to the task of predicting preferences and are generally useful for probabilistic inference.

Various other data analysis tools exist from which one may leverage the data already contained in databases to learn new insights regarding the data by uncovering useful patterns, relationships, or correlations.

It is usually desirable for a data analyst to visualize the relationships and patterns underlying the data. Existing exploratory data analysis techniques include plotting data for subsets of variables, and various clustering methods. However, inasmuch as the data analyst desires to have as many tools at his or her disposal as possible, new visualization techniques for displaying the relationships and patterns underlying data are always welcome.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to visualization of high-dimensional data. A graph is constructed for a set of data to represent associations between variables of the data set. The graph includes a plurality of nodes, in which each node corresponds to a variable. The graph also includes edges interconnecting nodes indicative of an association between the interconnected nodes. The associations can be symmetric or asymmetric and the corresponding edges may undirected or directed, respectively.

In accordance with an aspect of the present invention, one or more measures of association may be obtained for each pair of variables in the data set or domain. The type of association employed determines whether the resulting graph is a directed graph or an undirected graph.

Another aspect of the present invention provides a methodology for visualizing an association between variables of a high-dimensional data set. One of a plurality of measures of associations is selected for computing a measure of association between the variables. The association between variables is displayed in a graph in which a node represents each variable and an edge interconnecting nodes represents an association between the interconnected nodes. According to a particular aspect of the invention, the measure of association may be symmetric or asymmetric.

By way of example, if the measure of association is symmetric, an association is computed for every pair of variables. A non-directional edge is drawn in the graph interconnecting each pair of associated nodes indicative of the association between each pair of associated variables represented by the interconnected nodes. If the measure of association is asymmetric, for every pair of variables (X, Y), a first directional measure association is computed, which may be represented as A(X,Y), and a second directional measure of association is computed, which may be represented as A(Y, X). A first directional edge is drawn in the graph from the node association with X to the node associated with Y indicative of the first measure of association. A second directional edge is drawn in the graph from Y to X indicative of the second measure of association.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention provides a system and method to visualize relationships between variables as an association network. The relationships characterized by the association network may include symmetric or asymmetric measures of association between variables learned from the data. The association network may be displayed as a graph that includes nodes, which represent variables, and edges, which represent associations between variables represented by the nodes. As a result, an association network constructed in accordance with the present invention helps a user to visualize useful information from data according to which measure of association is employed to compute the measures of association between variables.

Figure 1:
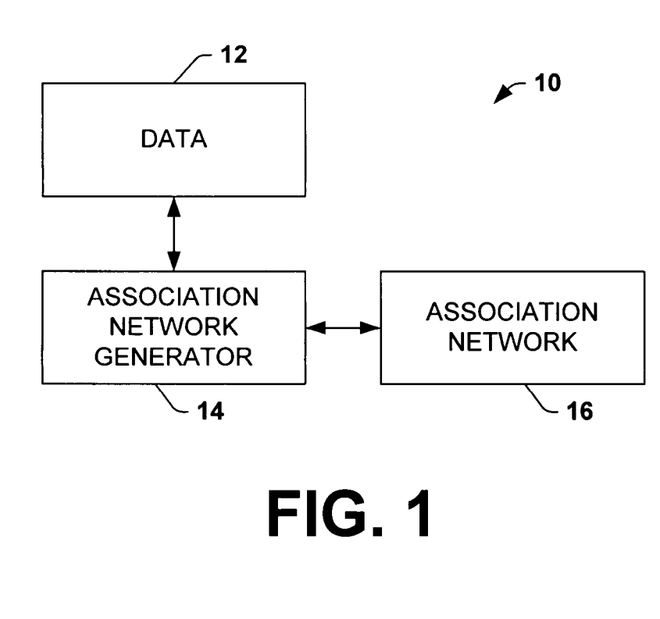
FIG. 1 is a simplified block diagram of a system to visualize data in accordance with the present invention.

FIG. 1 depicts a block diagram of a system 10 that may be implemented to visualize data 12 in accordance with an aspect of the present invention. The system 10 includes an association network generator 14 that is programmed and/or configured to construct an association network 16, which visualizes relationships between different variables in the data 12. For example, the network generator 14 employs an algorithm to measure association between different variables in the data 12. The network generator 14 is operative to employ one or more measures of association, which may include a directional or non-directional measure of association between variables in the data.

By way of illustration, the network generator 14 employs the association algorithm to compute correlations between respective pairs of variables represented by the data 12. When an undirected measure of association is employed, for example, a single association value A(X,Y) may be computed for each pair of variables X and Y. In contrast, when a directed measure of association is utilized, a pair of association values A(X, Y) and A(Y, X) may be computed for each pair of variables X and Y.

The network generator 14 constructs the association network 16 according to the type (directed or undirected) of association measure being used. The association network 16 is constructed in graphical form having nodes and a number of connections interconnecting the nodes to represent associations between the nodes. Each node corresponds to a variable of the data 12 (e.g., a column or dimension of the data). As mentioned above, the network 16, for example, can be displayed as a directed graph or an undirected graph. A directed graph may include a pair of edges between each pair of nodes, with one edge of the pair corresponding to a measure of association from a first node to a second node and the other edge corresponding to a measure of association from the second node to the first node. In an undirected graph, each pair of nodes may be connected by a single edge between such nodes. The computed measures of association further may be labeled in connection with each edge. Other visualization techniques also may be utilized, in accordance with the present invention, to help visualize various aspects of the association.

Figure 2:
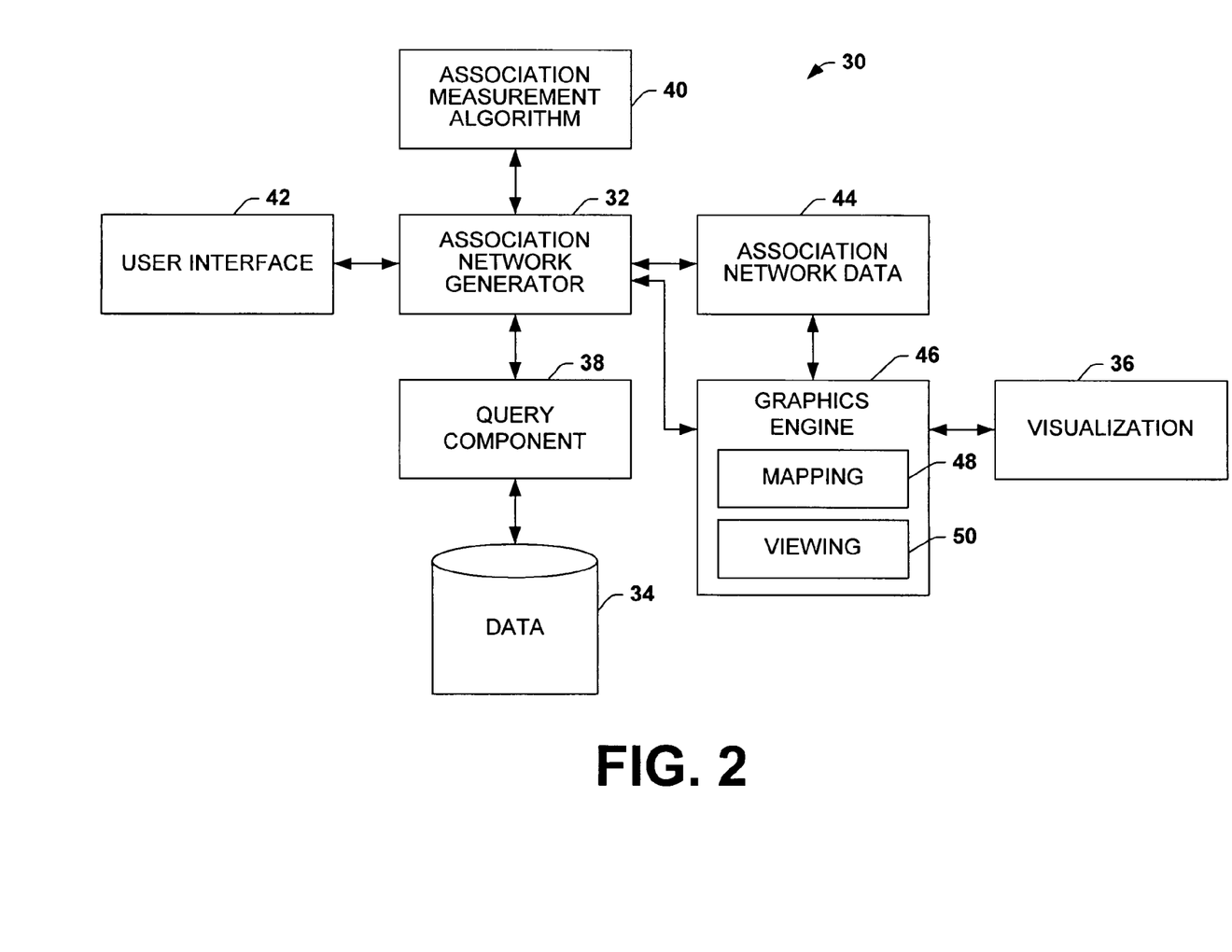
FIG. 2 is a functional block diagram of a system to visualize data in accordance with the present invention.

FIG. 2 illustrates another example of a system 30 operative to provide an association network for visualizing data in accordance with an aspect of the present invention. The system 30 includes an association network generator 32 programmed and/or configured to access stored data 34 and construct a corresponding association network, which is displayed as an interactive visualization 36 thereof. In particular, the association network generator 32 employs a query component 38 to query stored data 34. The stored data 34, for example, is a database having a plurality of records with associated fields populated by one or more processes or services over time. Such data may be stored at one or more storage locations (local or remote) relative to the instance of the network generator 32.

By way of illustration, the data 34 may represent transactional and/or personal data for users of a Web site, point of sale data, satellite image data, credit card transaction data, insurance information (e.g., policy data, premium data, claims data), financial market data, health care related data, banking data, hospitality service data, etc. For the example of Web-related data, for example, a server associated with the Web site may collect data based on forms submitted by the user, based on cookies associated with the user, and/or based on user log files. The server may, in turn, integrate the collected data with other data sources and organize such information according to a predetermined format. The query component 38 thus is able to query selected parts of the stored data 34, as instructed by the association network generator 32.

The association network 32 is associated with one or more algorithms 40 to measure association between variables. A user interface 42 also may be associated with the network generator 32 for receiving user inputs, such as may be employed to control the graphical visualization 36 of the association network. For example, a user may employ a user input device to choose a desired measure of association to employ for computing measures of association between variables in the data 34 accessed by the query component 38. The association network generator 32 thus employs the measurement algorithm to compute appropriate measures of association based on the stored data 34. The association network generator 32, in turn, provides association network data 44 indicative of the computed measures of association for the variables in the data 34.

By way of example, the association measurement algorithm 40 operates on each pair of variables X and Y of the data 34 according to the type of algorithm being employed. The available measures of association may be symmetric (or non-directional) or asymmetric (or directional). According to a particular aspect of the present invention, a symmetric measure of association computes a measure of association based on a pair wise correlation of variables in the data 34 (e.g., a measure of association between each pair of variables X and Y, namely, A(X,Y), where A(X,Y)≈A(Y, X)). An asymmetric measure of association also performs a pair wise correlation of the variables, but computes a directional measure of association between a pair of variables in both the direction from X to Y (e.g., A(X,Y)) and the direction from Y to X (e.g., A(Y, X)).

By way of further illustration, possible measures of symmetric association between variables X and Y include the Bayes factor for the two variables being dependent versus being independent, e.g., log p(data|X and Y are dependent)—log p(data|X and Y are independent). A more detailed discussion of a Bayesian approach to measuring association between variables may be found in D. Chickering and D. Heckerman and C. Meek, A Bayesian approach to learning {Bayesian} networks with local structure", *Proceedings of Thirteenth Conference on Uncertainty in Artificial Intelligence*, Providence, RI, 1997, pp. 80-89. Other symmetric measures of association include the standard correlation (e.g., cov(X, Y)/stdev(X)stdev(Y)) and the Pearson correlation coefficient. Additional information concerning these and other symmetric measures of association may be found in the 1982 edition of the *Encyclopedia of Statistical Sciences*, which is edited by Kotz, Johnson an and Read and published by John Wiley and Sons and, in particular, in sections entitled Correlation, Pearson's Coefficient of Contingency, and Measures of Association, which sections are incorporated herein by reference. Those skilled in the art will understand and appreciated other symmetric measures of association that may be utilized in accordance with the present invention.

Examples of asymmetric measures of association, which may be used in accordance with the present invention, include the linear regression coefficient (e.g., when Y depends linearly on X with Gaussian noise) and the Kullback-Leibler divergence between one variable and the other. In general, the Kullback-Leibler divergence is a measure of how different one probability distribution is from another. Additional information relating to asymmetric measures of association and their implementation may be found in the above-referenced *Encyclopedia of Statistical Sciences*, such as in sections entitled: Correlation, Kullback-Leibler Information, and Measures of Association, which sections are incorporated herein by reference.

Referring back to FIG. 2, a graphics engine 46 employs the association network data 44 to construct the graphical visualization 36 that identifies the variables and measures of association between such variables. In particular, the visualization 36 includes nodes (or items) representing variables, which are interconnected by edges (or arcs), such as shown and described below with respect to FIGS. 4-8. Each edge represents the association between the pair of variables corresponding to nodes connected by each respective edge. In addition, a textual and/or graphical label may be associated with each edge to further identify respective computed measures of association.

The graphics engine 46 may include a mapping function 48 and viewing controls 50 to control display of the association network data 44. The mapping function 48, for example, controls which aspects of the data 44 are mapped to which parts of the graphical visualization 36. The viewing control 50, for example, controls which nodes and edges are displayed as part of the visualization, such as based on the strength of association between variables of the network data 44.

Alternatively or additionally, the viewing control 50 (or other aspects of the graphics engine 46) may employ one or more visualization techniques to graphically represent the measures of association between interconnected nodes. For example, the edges may employ a color-coding scheme, a gray scale scheme, variable line thickness for edges, etc., to illustrate different levels of measured association. In addition, the graphics engine 46 may encode the strength of association between a selected node (e.g., selected by the user interface 42) with its associated nodes by color or gray-scale labeling of the nodes associated with the selected node or by otherwise varying the appearance of such nodes as a function of its measured association with the selected node.

Figure 3:
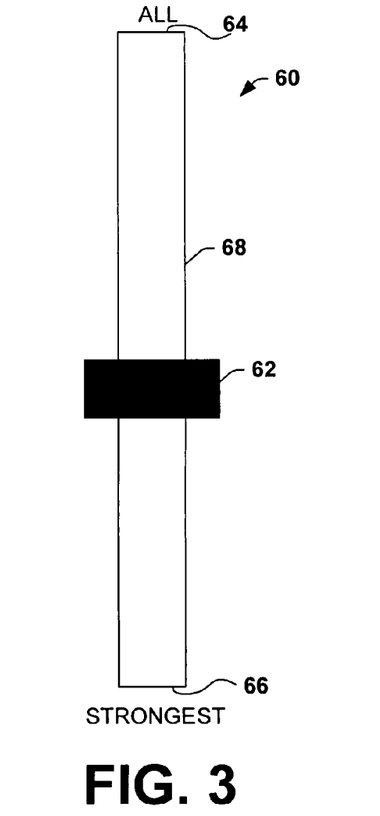
FIG. 3 is an example of a user interface element in accordance with the present invention.

According to one particular aspect, the edges of the graph may be configured to represent a level or degree of association between the nodes interconnected by the edges. FIG. 3 illustrates an example of a user interface element 60 that may be associated with the graph for controlling the association threshold above which edge associations are displayed. Specifically, the user interface element 60 is implemented as graphical bar 62 that is moveable between ends 64 and 66 of a graphical track 68. A range of values span between the ends 64 and 66 of the track 68, over which the bar 62 may traverse to select a position corresponding to a desired level of association to be displayed on the graph 36 (FIG. 2). In this example, one end 64 of the track (labeled "ALL") corresponds to a low level of association in which all of the edges are displayed. The other end 66 (labeled "STRONGEST") corresponds to the strongest level of association, which is operative to display only those edges representing a very strong level of association between nodes.

The user thus may move the bar 62 between the two ends 64 and 66 of the track 68, such that the edges are displayed as a function of where the bar is located on the track. For example, if the bar 62 is closer to the "ALL" end 64 of the track 68, then more of the edges (and nodes connected by such edges) typically will be shown. In contrast, if the bar 62 is closer to the "STRONGEST" end of the span track, then usually less of the edges will be shown depending on the strength of associations for the association data 44 (FIG. 2).

Those skilled in the art will understand and appreciated that various other types of user interface elements and controls may be utilized to control the appearance of the association network being graphically visualized. For example, another user interface component could be associated with nodes or edges for graphically (and/or textually) identifying each node that is associated with a selected node and/or the level of association between the displayed nodes. In this way a user, may perceive only those associations for a selected node, which further may be controlled according to the graphical slider control of FIG. 3.

Figure 4:
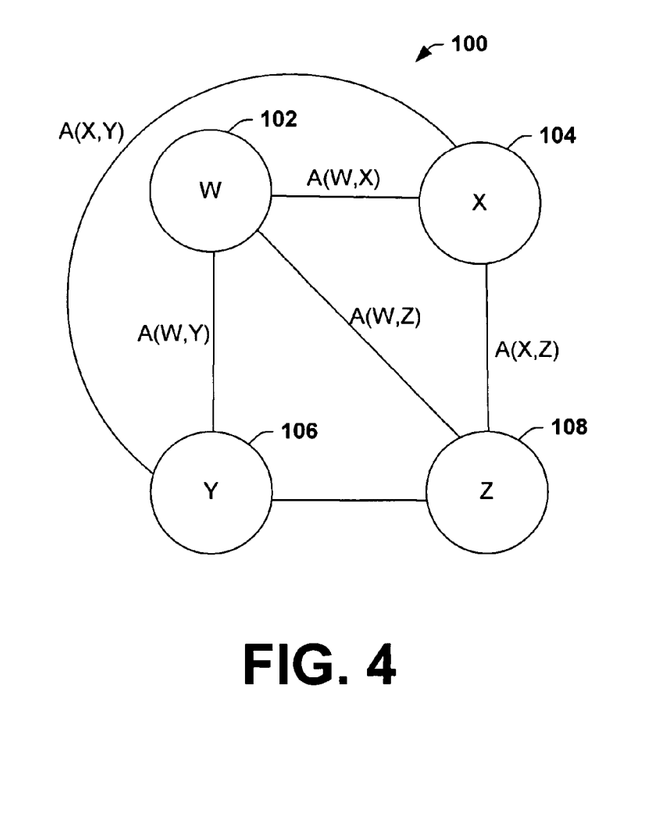
FIG. 4 is an example of an association network to visualize symmetric association between nodes in accordance with the present invention.

FIG. 4 illustrates an example of an undirected (or symmetric) association network 100 constructed in accordance with an aspect of the present invention. The network 100 includes nodes 102, 104, 106, and 108 for variables W, X, Y, and Z, respectively. An edge (or arc) interconnects each pair of nodes. Each edge further includes an indication of association labeled adjacent each respective edge to identify the measure of association between each pair of nodes. The indications of association, for example, include a value, represented as A(X, Y), A(W, Y), A(W, X), A(W, Z), and A(X, Z), such as computed by applying a symmetric measure of association to stored data. The symmetric measure of association, for example, may be selected by receiving a selection at a user interface (e.g., the interface 42 of FIG. 2).

Figure 5:
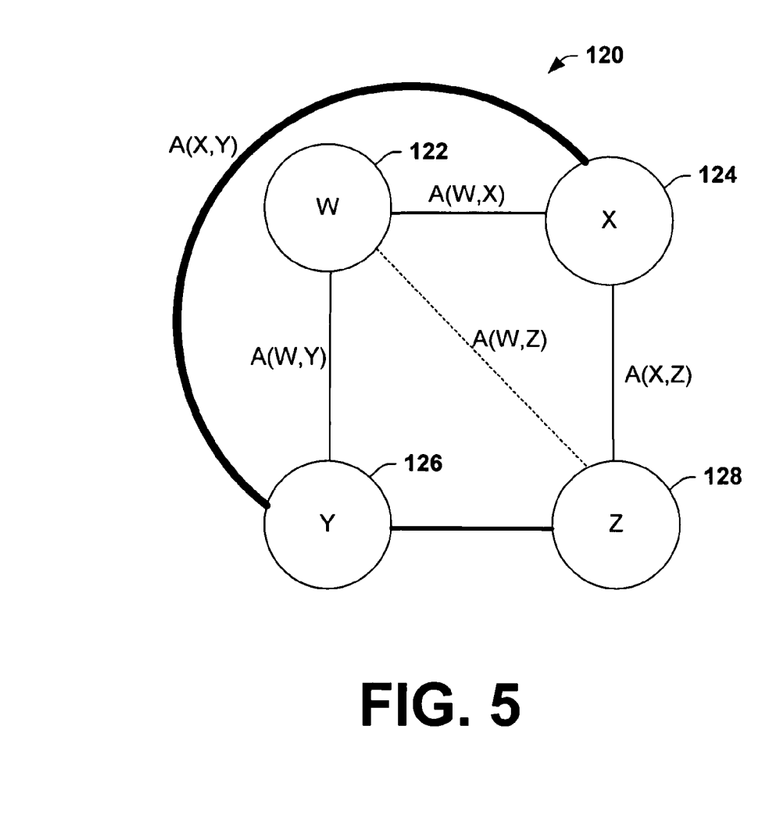
FIG. 5 is another example of an association network to visualize symmetric association between nodes in accordance with the present invention.

FIG. 5 illustrates another example of a symmetric association network 120 in accordance with the present invention to display association between the variables W, X, Y, and Z. As in FIG. 4, the variables W, X, Y, and Z are graphically represented as nodes 122, 124, 126, and 128, respectively. Edges interconnect each of the nodes to identify the association between such nodes. In this example, each of the edges further has a line width indicative of the measure of association between nodes. For example, a thicker line may represent a stronger association, whereas a thin (or dotted) line may represent a weaker association. A value for the measure of association between nodes, indicated as A(X, Y), A(W, Y), A(W, X), A(W, Z), also may be represented textually adjacent each respective edge. In this way, a user may more easily perceive that the association between nodes 124 and 126 is the strongest and the association between nodes 122 and 128 is the weakest. Those skilled in the art will understand and appreciate other visualization techniques that could be utilized, in accordance with the present invention, to graphically represent the computed association between nodes.

Figure 6:
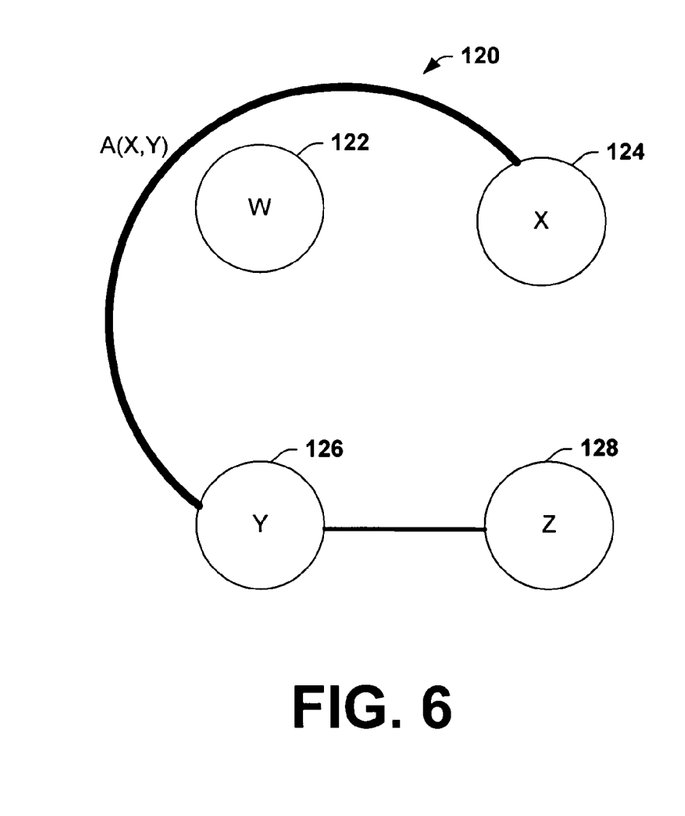
FIG. 6 is an example of the association network of FIG. 5 showing associations having a certain condition relative to a selected level of association.

FIG. 6 depicts another example of the association network of FIG. 5 in which less than all measures of association between the nodes are illustrated. This may correspond to a situation, for example, when a viewing control (e.g., see FIG. 3) has been employed to restrict the level of association above (or below) a selected level of association. In the illustrated example, edges are shown to connect the nodes 122 and 124 as well as the nodes 126 and 128. A user may further employ the viewing control to select a weaker (or stronger) level of association to display a greater number of associations between nodes.

The particular arrangement of nodes and edges shown in FIGS. 4, 5, and 6 are intended solely for purposes of illustration, as the present invention is by no means limited to such arrangements. In addition, while the particular examples in FIGS. 4-6 show four nodes corresponding to variables, W, X, Y, and Z, it is to be appreciated that typically a greater number of variables are represented in a network constructed in accordance with an aspect of the present invention, although a lesser number could also be used.

Figure 7:
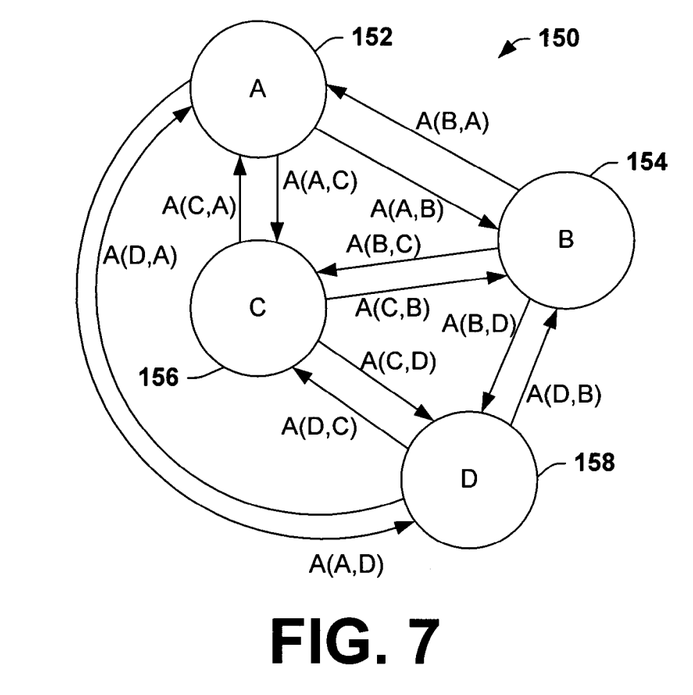
FIG. 7 is an example of an association network to visualize asymmetric measures

FIG. 7 depicts an example of a directed (or asymmetric) association network 150 in accordance with an aspect of the present invention. In this example, the network includes a plurality of nodes 152, 154, 156, and 158 representing respective variables A, B, C, and D. A pair of edges interconnects each pair of nodes to represent corresponding directed measures of association between each respective pair of nodes. For example, the edges between the nodes 152 and 156 correspond to association measures A(C, A) and A(A, C) and the edges between nodes 156 and 158 correspond to association measures A(C, D) and A(D, C). Each other pair of nodes includes similar correlations between associated variables, as indicated in FIG. 7. That is, each pair of nodes includes a pair of directed measures of association, such as may represent the dependency of a first of the pair on the second node of the pair and the dependency of the second node on the first node.

Figure 8:
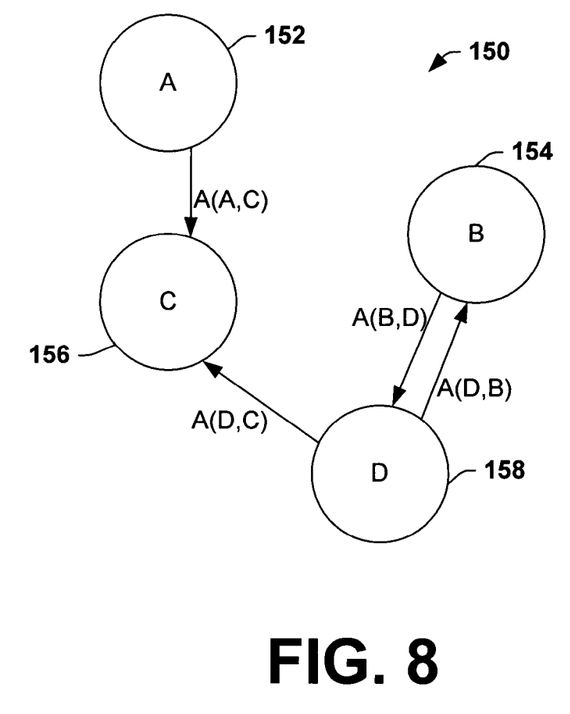
FIG. 8 is an example of the association network of FIG. 7 showing associations having a certain condition relative to a selected level of association.

FIG. 8 illustrates an example of the association network 150 of FIG. 7 in which less than all measures of association between the nodes 152, 154, 156, and 158 are shown. In particular, edges are shown to represent the following directed measures of association: A(A, C), A(D, C), A(B, D) and A(D, B). This may correspond to a situation, for example, when a viewing control is configured to display a level of association above (or below) a selected level, such that the illustrated edges have measures of association within the selected range. The hidden measures of association, for example, have values that are not within the selected range.

It is to be appreciated that an association network implemented in accordance with an aspect of the present invention may be configured to show other types of relationships, such as by the level of dependency among various nodes. Those skilled in the art will understand and appreciate other visualization techniques that further may be implemented in a system according to the present invention.

Figure 9:
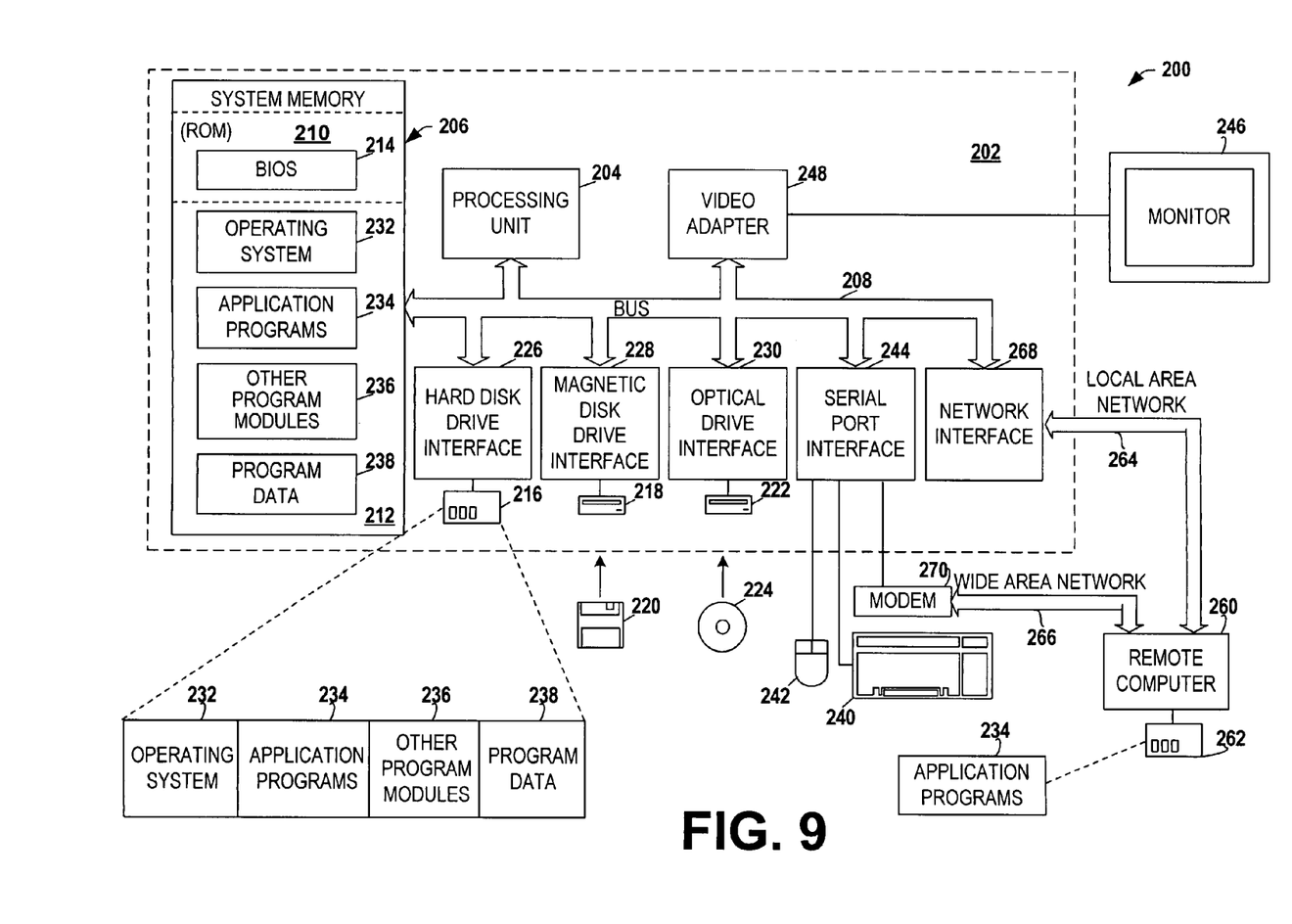
FIG. 9 is an example of an operating environment for a system or method implemented in accordance with the present invention.

In order to provide additional context for the various aspects of the present invention, FIG. 9 and the following discussion are intended to provide a brief, general description of a suitable computing environment 200 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 200 for implementing the various aspects of the invention includes a conventional computer 202, including a processing unit 204, a system memory 206, and a system bus 208 that couples various system components including the system memory to the processing unit 204. The processing unit 204 may be any commercially available or proprietary processor. In addition, the processing unit may be implemented as multi-processor formed of more than one processor, such as may be connected in parallel.

The system bus 208 may be any of several types of bus structure including a memory bus or memory controller, a peripheral bus, and a local bus using any of a variety of conventional bus architectures such as PCI, VESA, Microchannel, ISA, and EISA, to name a few. The system memory 206 includes read only memory (ROM) 210 and random access memory (RAM) 212. A basic input/output system (BIOS) 214, containing the basic routines that help to transfer information between elements within the computer 202, such as during start-up, is stored in ROM 210.

The computer 202 also may include, for example, a hard disk drive 216, a magnetic disk drive 218, e.g., to read from or write to a removable disk 220, and an optical disk drive 222, e.g., for reading from or writing to a CD-ROM disk 224 or other optical media. The hard disk drive 216, magnetic disk drive 218, and optical disk drive 222 are connected to the system bus 208 by a hard disk drive interface 226, a magnetic disk drive interface 228, and an optical drive interface 230, respectively. The drives and their associated computer-readable media provide nonvolatile storage of data, data structures, computer-executable instructions, etc. for the computer 202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 200, and further that any such media may contain computer-executable instructions for performing the methods of the present invention.

A number of program modules may be stored in the drives and RAM 212, including an operating system 232, one or more application programs 234, other program modules 236, and program data 238. The operating system 232 may be any suitable operating system or combination of operating systems.

A user may enter commands and information into the computer 202 through one or more user input devices, such as a keyboard 240 and a pointing device (e.g., a mouse 242). Other input devices (not shown) may include a microphone, a joystick, a game pad, a satellite dish, wireless remote, a scanner, or the like. These and other input devices are often connected to the processing unit 204 through a serial port interface 244 that is coupled to the system bus 208, but may be connected by other interfaces, such as a parallel port, a game port or a universal serial bus (USB). A monitor 246 or other type of display device is also connected to the system bus 208 via an interface, such as a video adapter 248. In addition to the monitor 246, the computer 202 may include other peripheral output devices (not shown), such as speakers, printers, etc.

The computer 202 may operate in a networked environment using logical connections to one or more remote computers 260. The remote computer 260 may be a workstation, a server computer, a router, a peer device or other common network node, and typically includes many or all of the elements described relative to the computer 202, although, for purposes of brevity, only a memory storage device 262 is illustrated in FIG. 9. The logical connections depicted in FIG. 9 may include a local area network (LAN) 264 and a wide area network (WAN) 266. Such networking environments are commonplace in offices, enterprise-wide computer networks, intranets and the Internet.

When used in a LAN networking environment, the computer 202 is connected to the local network 264 through a network interface or adapter 268. When used in a WAN networking environment, the computer 202 typically includes a modem 270, or is connected to a communications server on the LAN, or has other means for establishing communications over the WAN 266, such as the Internet. The modem 270, which may be internal or external, is connected to the system bus 208 via the serial port interface 244. In a networked environment, program modules (including application programs 36) depicted relative to the computer 202, or portions thereof, may be stored in the remote memory storage device 262. It will be appreciated that the network connections shown are exemplary and other means (e.g., wired or wireless) of establishing a communications link between the computers 202 and 260 may be used.

In accordance with the practices of persons skilled in the art of computer programming, the present invention has been described with reference to acts and symbolic representations of operations that are performed by a computer, such as the computer 202 or remote computer 260, unless otherwise indicated. Such acts and operations are sometimes referred to as being computer-executed. It will be appreciated that the acts and symbolically represented operations include the manipulation by the processing unit 204 of electrical signals representing data bits which causes a resulting transformation or reduction of the electrical signal representation, and the maintenance of data bits at memory locations in the memory system (including the system memory 206, hard drive 216, floppy disks 220, CD-ROM 224, and remote memory 262) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
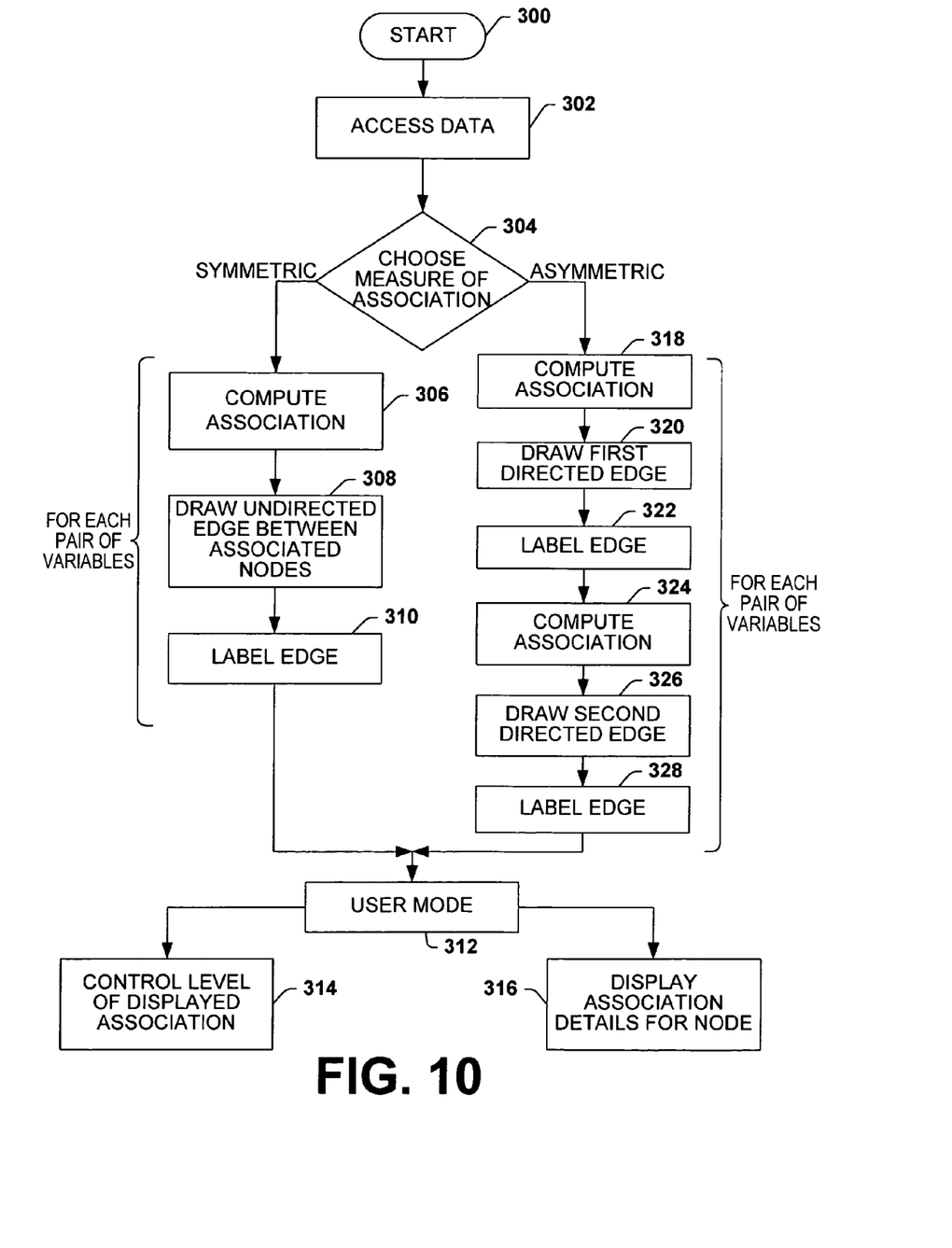
FIG. 10 is a flow diagram illustrating a methodology to visualize data as an association network in accordance with the present invention.

In view of the foregoing structural, functional, and graphical features described above, a methodology in accordance with the present invention will be better appreciated with reference to FIG. 10. While, for purposes of simplicity of explanation, the methodology of FIG. 10 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

Referring to FIG. 10, the methodology begins at 300, such as in connection with activating an association network generator, such as may be stored as a computer-executable instructions in a computer-readable medium (e.g., on a machine or in a more portable form) in accordance with an aspect of the present invention. Next, at 302, the network generator accesses stored data, such as multi-dimensional data having a plurality of variables for which one desires to know useful relationships.

At 304, a measure of association is chosen. The measure of association may be either a symmetric measure of association or an asymmetric measure of association. The methodology will proceed differently depending on which type of measure is chosen at 304.

For example, if a symmetric measure of association is selected, the methodology proceeds to 306 in which a measure of association is computed for a first pair of variables in the accessed data (302). At 308, the measure of association between each pair of variables is then represented by drawing an undirected edge drawn between nodes that represent each respective pair of variables. Each edge thus identifies a symmetric measure of association between each pair of variables. The edges and/or nodes further may be encoded to represent associations between nodes in greater detail. For example, gray-scale, color-coding, line weighting, etc. may be employed to graphical visualize the associations between nodes. In addition, at 310, each edge (e.g., those edges being displayed) may be labeled with text and/or graphics to identify a value indicative of the measure of association between the variables represented by each respective edge. Steps 306 through 310 are repeated once for each pair of variables until a measure of association for each respective pair of variables has been computed and graphically displayed.

After the association network has been constructed, the methodology proceeds to 312 in which a user mode is entered. In the user mode, a user may utilize an input device (e.g., a keyboard, a pointing device, a remote control, etc.) to selectively control the appearance of the association network. For example, at 314, a user may control minimum or maximum levels of association that will be displayed in the network, such as by setting a viewing control graphical user interface element. Additionally or alternatively, at 316, a user may select one or more nodes for which details concerning their associations may be displayed. For example, a user may select one node, which could result in the nodes associated with the selected node as well as the interconnecting edges and labels being highlighted in the network. Those skilled in the art will understand and appreciate other techniques that could be employed to visualize other aspects of the association network in accordance with the present invention.

If, at 304, an asymmetric measure of association is selected, the methodology proceeds to 318. At 318, a measure of association is computed in a first direction for a pair of variables of the accessed data (302). Next, at 320 a directed edge is drawn between the nodes according to the first direction. At 322, the directed edge between such nodes is labeled with the computed measure of association (318). At 324, a measure of association is computed for that same pair of variables but in an opposite direction. At 326, a directed edge is drawn in the association network between the nodes in the opposite direction of the edge drawn at 316. The edge also may be labeled (328) to identify the measure of association computed at 324.

The functionality of blocks 318-328 is repeated once for each pair of variables in the data that is to be analyzed. That is, for each pair of variables X and Y, a measure of association is computed for A(X, Y) (318), a corresponding directed edge is drawn from X to Y (320) and labeled (322) to identify a corresponding measure of association for the respective directed measure of association. Then, a measure of association A(Y, X) is computed (324), a corresponding edge is drawn (326) and labeled (328) with a corresponding indication of association for that edge. After the association network has been graphed, the methodology proceeds to 312 and may continue in a similar manner as described above.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer-implemented system to facilitate visualization of high-dimensional data, comprising:
    at least one processor coupled to a memory, the processor executes:
        a user interface that, responsive to a user input of a desired measure of association, obtains a selection of an association measurement algorithm from a plurality of algorithms in accordance with the desired measure of association, the plurality of algorithms from which the association measurement algorithm is selected include:
            at least one algorithm that provides a symmetric measure of association between pairs of data X and Y, wherein the symmetric measure of association indicates there is no directedness of association between data X and Y regardless of the sequence of entering X and Y in the algorithm; and
            at least another algorithm that provides an asymmetric measure of association between pairs of data X and Y, wherein the asymmetric measure of association indicates that the measured association between X and Y is different than for Y and X when the sequence of applying X and Y to the algorithm is X first and Y second compared with applying Y first followed by X to create two measures of association A(X, Y) and A(Y, X);
        the association measurement algorithm selected via the user interface:
            determines when a relationship exists between pairs of variables in the high-dimensional data,
            determines a strength of the relationship, and
            provides the desired measure of association between the pairs of variables in the high-dimensional data when a relationship is determined to exist;
        an association network generator that constructs a graph based on the measure of association calculated between the pairs of variables in the high-dimensional data, the graph includes nodes representing each variable in the high-dimensional data, such that:
            for representation of a symmetric measure of association, one edge interconnects the pair of nodes, and
            for representation of an asymmetric measure of association, two edges are simultaneously displayed with one edge representing the association A(X, Y) and the other edge representing A(Y, X),
            wherein the graph further comprises a label adjacent the at least one edge to identify the measure of association calculated between the nodes interconnected by the at least one edge; and
        a viewing control that controls a display of the constructed graph via the user interface based in part on the user input of the desired measure of association to the user interface.

2. The system of claim 1, wherein the graph includes undirected edges when the measure of association is a symmetric measure of association.

3. The system of claim 1, wherein the graph includes directed edges when the measure of association is an asymmetric measure of association.

4. The system of claim 1, wherein the viewing control further comprises:
    a graphical user interface element moveable between first and second positions to select a desired strength of relationship between the first and second positions, and
    the viewing control operative to control which edges are displayed as part of the graph based on the strength of relationship selected.

5. The system of claim 4, wherein the viewing control is operative to select a particular node to display in an emphasized manner together with edges interconnecting the particular node and each node associated therewith.

6. The system of claim 5, wherein each node associated with the particular node is encoded in a manner to indicate the strength of relationship of each edge associated with the particular node.

7. The system of claim 1, wherein each of the edges in the graph further comprises graphical features indicative of a corresponding strength of relationship between nodes interconnected by each respective edge.

8. The system of claim 1, wherein the viewing control is operative to select a particular node to display in an emphasized manner together with edges interconnecting the particular node and each node associated therewith, each edge associated with the particular node is encoded in a manner to indicate the strength of relationship of each node associated with the particular node, wherein the association network generator is configured to access stored data and construct an association network displayed as an interactive visualization, the stored data comprising transactional and personal data for a plurality of users of a Web site, point of sale data, satellite image data, credit card transaction data, insurance information, financial market data, health care related data, banking data, and/or hospitality service data.

9. The system of claim 8, wherein, responsive to the user input of a desired measure of association, the user interface displays one or more edges associated with the particular node when the strength of relationship between the particular node and the associated node is at least as strong as the desired measure of association.

10. A computer-implemented method for visualizing a high-dimensional data set having a plurality of variables comprising:
    selecting, via a user interface, an algorithm from a plurality of algorithms that determines relationships among variables in a data set retained in a memory, the plurality of algorithms includes:
        at least one algorithm that provides a symmetric measure of association between pairs X and Y of the plurality of variables, where X and Y can be any pair of variables in the plurality of variables the symmetric measure of association representing a bi-directional measure of association indicating that the association between X and Y is symmetric where $A(X, Y) \approx A(Y, X)$, and enabling a single non-directed edge to be graphed between X and Y; and at least another algorithm that provides an asymmetric measure of association between X and Y, the asymmetric measure of association indicates that the measured association between X and Y is different than for Y and X when the sequence of applying X and Y to the algorithm is X first and Y second compared with applying Y first followed by X to create two measures of association $A(X, Y)$ and $A(Y, X)$, and enabling two directed edges to be graphed, one from X to Y and one from Y to X;

executing the selected algorithm on a processor to calculate at least one measure of association between pairs X and Y of the plurality of variables, the calculated measure of association indicates an existence of a relationship between a pair X and Y of variables in the data and a degree of strength of the relationship;

graphically representing the plurality of variables as nodes in a graph on a display device;

connecting pairs of nodes in the graph with the pairs of nodes corresponding to pairs of variables with a relationship indicated by a measure of association calculated by the selected algorithm, wherein the graph further comprises a textual and/or graphical label adjacent an at least one edge to identify the calculated measure of association between the nodes interconnected by the at least one edge;

representing the symmetric measure of association by displaying the single non-directed edge connecting the pair of nodes, representing the asymmetric measure of association by displaying the two directed edges, one edge representing the association $A(X, Y)$ and the other edge representing $A(Y, X)$; and controlling which of the nodes and edges are displayed according to a selected strength of relationship.

11. The method of claim 10, further comprising labeling edges to identify a value indicative of the strength of relationship between variables interconnected by the edges.

12. The method of claim 10, further comprising receiving a selection of a desired measure of association, the algorithm provides measures of association in accordance with the selection.

13. The method of claim 10, further comprising providing a graphical user interface element that is moveable for selectively controlling which of the nodes and edges are displayed based on the position of the graphical user interface element.

14. The method of claim 10, further comprising, in response to receiving a user input, displaying, via the user interface, a particular node in an emphasized manner together with edges interconnecting the particular node and each node associated therewith.

15. The method of claim 14, further comprising graphically encoding each node associated with the particular node in a manner to indicate the strength of association of each encoded node with the particular node.

16. The method of claim 14, further comprising controlling graphical features of the edges to indicate a corresponding strength of association between nodes interconnected by the respective edges.

17. A system to facilitate visualization of data, comprising:
means for selecting, via a user interface, an algorithm from a plurality of algorithms retained in a memory that determines if a relationship exists between variables in the data, the plurality of algorithms includes:

at least one algorithm that provides a symmetric measure of association between pairs of data X and Y, the symmetric measure of association representing a bi-directional measure of association indicating that the association between X and Y is symmetric where $A(X, Y) \approx A(Y, X)$, and enabling a single non-directed edge to be graphed between X and Y, and at least another algorithm that provides an asymmetric measure of association between pairs of data X and Y, the asymmetric measure of association indicates that the measured association between X and Y is different than for Y and X when the sequence of applying X and Y to the algorithm is X first and Y second compared with applying Y first followed by X to create two measures of association $A(X, Y)$ and $A(Y, X)$, and enabling two directed edges to be graphed, one from X to Y and one from Y to X;

means for executing the selected algorithm on a processor to calculate at least one measure of association between two variables X and Y in the data if a relationship is determined to exist between the two variables, the calculated measure of association further indicates strength of the relationship, wherein a graph further comprises a textual and/or graphical label adjacent an at least one edge to identify the calculated measure of association between the nodes interconnected by the at least one edge;

means for graphically representing variables of the data as nodes on a display device;

means for connecting pairs of nodes by representing the symmetric measure of association by displaying the single non-directed edge connecting a pair of nodes having a symmetric measure of association and a pair of edges representing the asymmetric measure of association by displaying the two directed edges, one edge representing the association $A(X, Y)$ and the other edge representing $A(Y, X)$; and means for controlling which nodes and edges are displayed according to a selected strength of relationship.

18. The system of claim 17, further comprising means for receiving an instruction indicative of a desired measure of association.

19. The system of claim 18, wherein the means for connecting further comprises means for employing undirected edges when a symmetric measure of association is selected.

20. The system of claim 18 wherein the means for connecting further comprises means for connecting each associated pairs of the nodes with directed edges when an asymmetric measure of association is selected.

21. The system of claim 17, further comprising means for graphically encoding a selected node and for graphically encoding edges interconnecting the selected node and each node associated therewith to graphically indicate a relative strength of association between the selected node and the nodes associated with the selected node.

22. The system of claim 17, further comprising means for graphically encoding each node associated with a selected node so as to indicate a strength of association of each encoded node with the particular node.

23. The system of claim 17 further comprising means for one of emphasizing and de-emphasizing graphical features of the edges to indicate a corresponding strength of association between nodes interconnected by the respective edges.

24. A computer-implemented data visualization method, comprising:
   selecting, via a user interface, an association measurement algorithm from a plurality of algorithms that determines relationships among variables in a data set retained in a memory, the plurality of algorithms includes at least one algorithm that provides a symmetric measure of association and at least another algorithm that provides an asymmetric measure of association, wherein asymmetric measure of association between a pair of variables indicates the measure of association between the variables is dependent upon an order with which the variables are entered into the association measurement algorithm and a symmetric measure of association indicates there is no dependency on the order of entry;
   executing the selected association measurement algorithm on a processor to calculate a measure of association between at least two variables of a plurality of variables in a high-dimensional data set, the association measurement algorithm determines an existence of a relationship between the at least two variables of a plurality of variables and the calculated measure of association represents the relationship between the pairs of variables in the high-dimensional data set and a degree of strength of the relationship;
   constructing a graph having at least two nodes and at least one edge interconnecting the at least two nodes such that each edge interconnects a pair of nodes, each node represents a variable and the at least one edge corresponds to the calculated measure of association between the variables represented by the interconnected nodes, wherein the graph further comprises a textual and/or graphical label adjacent the at least one edge to identify the calculated measure of association between the nodes interconnected by the at least one edge;
   displaying the constructed graph on a display device as a plurality of items and plurality of connections, each connection representing the at least one edge and interconnecting a first item from the plurality of items representing a first node with a second item from the plurality of items representing a second node, connecting nodes with a symmetric relationships using a single edge to represent the singularity of association and connecting nodes with asymmetric relationships using a pair of edges with each edge representing the degree of association for the respective order of entry of each item into the measurement of association algorithm such that the degree of association calculated for a first order of entry need not equate to the degree of association calculated for a second order of entry, the constructed graph display includes a label adjacent to each connection to identify the calculated measure of association between the at least two nodes interconnected by the at least one edge represented by the connection, the plurality of items and the plurality of connections are displayed in a manner to indicate the strength of the relationship represented by the calculated measure of association; and
   obtaining instructions from a user via the user interface that indicate at least one of a selection of an association measurement algorithm, an emphasization of a displayed item or displayed connection or a selection of a minimum level of association displayed from the constructed graph.

25. A computer-implemented method for visualizing a high-dimensional data set having a plurality of variables, the method comprising:
   employing at least one processor to execute the visualization, comprising:
      selecting, via a user interface, a measure of association from a plurality of different measures of association to determine a measure of association between pairs X and Y of the plurality of variables based upon the sequence in which X and Y are entered into the measure of association, the selecting the measure of association comprising:
         at least one of the different measures of association being a symmetric measure of association with a symmetric measure of association indicating there is no directedness of association between X and Y regardless of the sequence of entering X and Y in the algorithm where $A(X, Y) \approx A(Y, X)$, and
         at least another of the different measures of association being an asymmetric measure of association with an asymmetric measure of association indicating that the measured association between X and Y is different than for Y and X when the sequence of applying X and Y to the algorithm is X first and Y second compared with applying Y first followed by X to create two measures of association $A(X, Y)$ and $A(Y, X)$;
      calculating an association between at least a first pair of the plurality of variables according to the selected measure of association, the calculated association indicates an existence of a relationship between the first pair of the plurality of variables in the data set and a degree of strength of the relationship;
      constructing a graph on a display device having nodes and at least one edge interconnecting a pair of the nodes, the pair of interconnected nodes representing the first pair of variables and the at least one edge representing the calculated association between the first pair of variables according to the selected measure of association, for representation of a symmetric measure of association one edge interconnects the pair of nodes, for representation of an asymmetric measure of association two edges displayed with one edge representing the association $A(X, Y)$ and the other edge representing $A(Y, X)$, wherein the graph further comprises a textual and/or graphical label adjacent the at least one edge to identify the calculated measure of association between the nodes interconnected by the at least one edge; and
      controlling displayed graphical features of the graph based on the measured association.

26. The method of claim 25, wherein, if a symmetric measure of association is selected, the at least one edge is displayed as an undirected connection corresponding to a symmetric measure of association between the pair of interconnected nodes.

27. The method of claim 25, wherein, if an asymmetric measure of association is selected, the at least one edge is displayed as a pair of directed edges to identify corresponding asymmetric associations between the pair of interconnected nodes.

28. A computer-implemented method for visualizing data, comprising:
   selecting, via a user interface, at least one algorithm from a plurality of algorithms that calculates a measure of association between at least two variables in a data set retained in a memory, the measure of association indicates existence of a relationship between the at least two variables and a strength of relationship between the at least two variables, the plurality of algorithms includes at least one algorithm that provides a symmetric measure of association and at least another algorithm that provides an asymmetric measure of association with the symmetric and asymmetric measures of association being based upon the order with which the variables are entered into the algorithm;

executing the at least one selected algorithm on a processor upon a set of high-dimensional data to determine relationships among at least two variables within the set of high-dimensional data with a symmetric measure of association indicating there is no directedness of association between X and Y regardless of the sequence of entering X and Y in the algorithm and an asymmetric measure of association indicating that the measured association between X and Y is different than for Y and X when the sequence of applying X and Y to the algorithm is X first and Y second compared with applying Y first followed by X to create two measures of association A(X, Y) and A(Y, X);

producing at least one node for each variable in the set of high-dimensional data;

creating at least one edge between at least two nodes when the at least two nodes correspond to variables within the set of high-dimensional data having a relationship determined by the at least one selected algorithm;

creating one edge between the at least two nodes where the measure of association is determined to be symmetric and creating a pair of edges between the at least two nodes where the measure of association is determined to be asymmetric with one edge representing the association A(X, Y) and the other edge representing A(Y, X), wherein the graph further comprises a textual and/or graphical label adjacent the at least one edge to identify the calculated measure of association between the nodes interconnected by the at least one edge;

generating an association network based at least in part on the produced nodes and edges; and displaying on a display device the generated association network to a user.

29. The computer-implemented method of claim 28, further comprising selecting a desired measure of association such that the at least one algorithm calculates the measure of association in accordance with the selection.

30. The computer-implemented method of claim 29, the at least one edge is an undirected edge when the desired measure of association is a symmetric measure of association.

31. The computer-implemented method of claim 29, the at least one edge is a directed edge when the desired measure of association is an asymmetric measure of association.

32. The computer-implemented method of claim 28, further comprising limiting nodes and edges displayed to the user to nodes interconnected with edges representing a strength of relationship greater than a threshold.

* * * * *